US 8,200,888 B2

(12) United States Patent  
Simonson

(10) Patent No.: US 8,200,888 B2  
(45) Date of Patent: Jun. 12, 2012

(54) SEEK TIME EMULATION FOR SOLID STATE DRIVES

(75) Inventor: Svanhild Simonson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 844 days.

(21) Appl. No.: 12/165,637

(22) Filed: Jun. 30, 2008

(65) Prior Publication Data

US 2009/0327583 A1    Dec. 31, 2009

(51) Int. Cl.  
G06F 12/00    (2006.01)

(52) U.S. Cl. ............ 711/103; 711/4; 711/100; 711/102; 711/111; 711/112; 711/113; 711/114; 711/115; 711/161; 711/162; 711/167; 710/4; 710/6; 710/39; 710/40; 710/42

(58) Field of Classification Search .................. 711/100, 711/111–115, 4, 161–162, 167; 710/4–6, 710/36, 39, 40, 42  
See application file for complete search history.

(56) References Cited

U.S. PATENT DOCUMENTS

| | | | |
|---|---|---|---|
| 6,536,034 B1 * | 3/2003 | Nassor ........................... | 717/110 |
| 6,658,535 B1 * | 12/2003 | Megiddo et al. ............... | 711/137 |
| 7,277,984 B2 * | 10/2007 | Ghosal et al. .................. | 711/112 |
| 2006/0200612 A1 * | 9/2006 | Hamid et al. .................. | 710/313 |

* cited by examiner

Primary Examiner — Tuan Thai  
Assistant Examiner — Zhou Li  
(74) Attorney, Agent, or Firm — Schubert Law Group PLLC

(57) ABSTRACT

Methods and apparatuses for delaying execution of input/output (I/O) requests for solid state drives are contemplated. Some embodiments comprise receiving I/O requests for a solid state drive and calculating amounts of time based on characteristics of the requests, such as differences of the logical block addresses (LBAs) of the requests. The embodiments may then delay responses by the solid state drive for the requests. Calculating the amounts of time and delaying the responses by the amounts of time may allow the solid state drives to emulate the responses of various types of hard disk drives. Some embodiments comprise an apparatus for delaying execution of the I/O requests for solid state drives. The apparatuses may have numerous modules, such as a request receiver to receive the I/O requests, a calculation module to calculate the amounts of delay times, and a delay module to delay the responses of the I/O requests.

18 Claims, 5 Drawing Sheets

SEEK TIME EMULATION FOR SOLID STATE DRIVES

FIELD

The embodiments herein generally relate to the field of data storage devices. More particularly, the embodiments relate to methods and apparatuses for delaying execution of input/output requests for solid state drives.

BACKGROUND

A solid-state drive (SSD) is a data storage device that utilizes solid-state memory (e.g., flash-type "non-volatile" memory or synchronous dynamic access memory (SDRAM) "volatile" memory) to store persistent data. SSDs are an alternative to conventional hard disk drives that have slower data access times due to the mechanical moving parts. The absence of rotating disks and mechanical devices in the SSD generally improves data access speed and reliability.

Traditional hard disk drives have one or more platters that rotate about a spindle. Data are generally stored on the platters in concentric rings, often referred to as tracks or cylinders. The data of the tracks are generally further divided into sectors. Sectors usually represent fixed amounts of data, such as 512 bytes or 1024 bytes. Files are stored on hard drives in clusters, sometimes termed allocation units. These clusters span across several physical sectors, generally with a fixed number of sectors per cluster for a particular hard drive.

Platforms coupled with hard disk drives use a variety of different schemes to access data stored on the drives. Accessing data stored on a hard disk drive may comprise reading data from the drive or writing data to the drive. One scheme comprises accessing the data by using references to cylinders, heads, and sectors (CHS). Another scheme comprises accessing the data using logical block addresses (LBAs). For the purpose of backwards compatibility, SSDs often access data in the same manner as traditional hard disk drives. For example, a platform may access data for a SSD using logical block addressing.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

Figure 1:
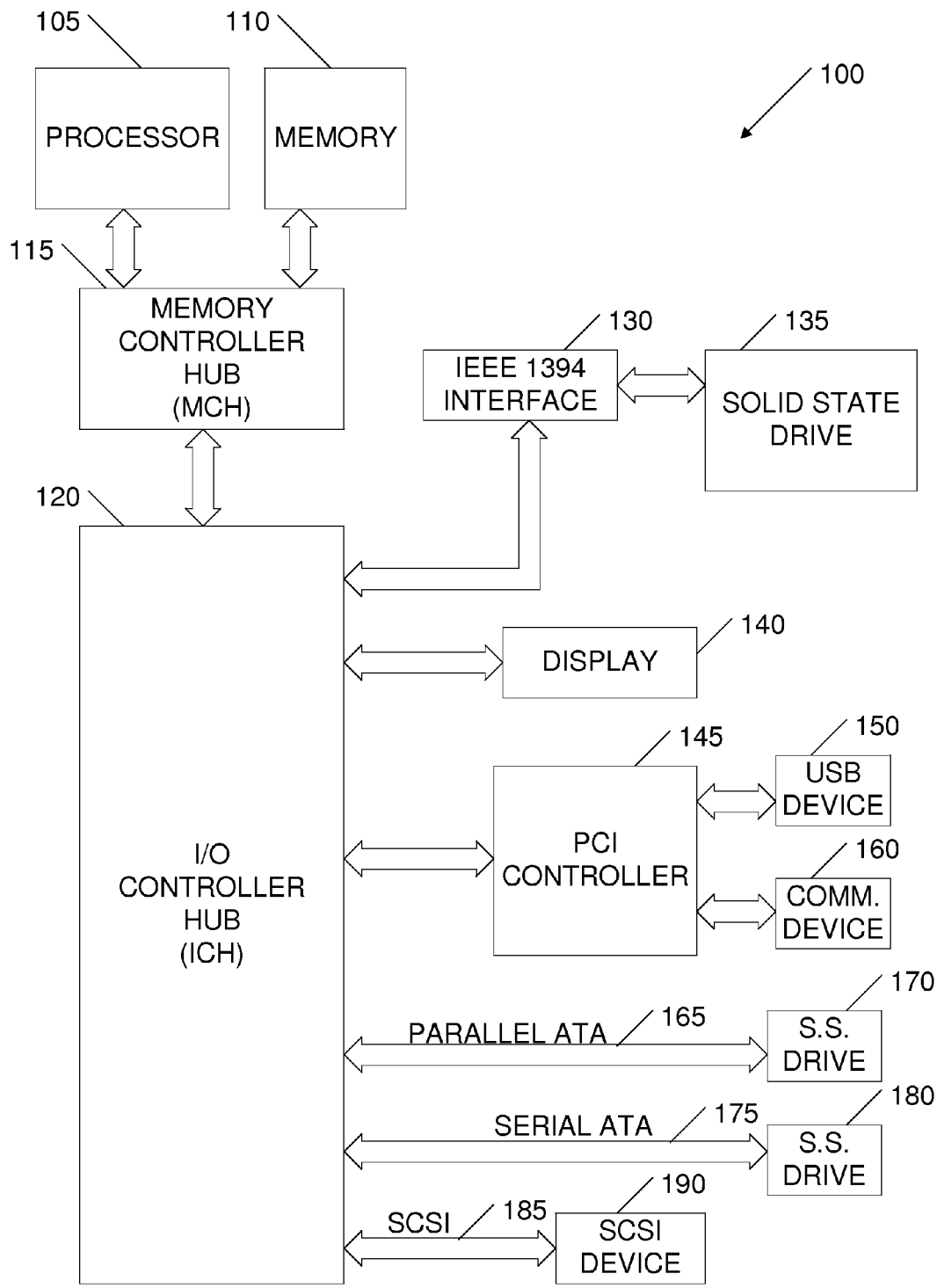
FIG. 1 depicts a system which processes I/O requests for a number of solid state drives, comprising a processor, memory, a memory controller hub, and an I/O controller hub.

The following is a detailed description of embodiments depicted in the accompanying drawings. The specification is in such detail as to clearly communicate the embodiments. However, the amount of detail offered is not intended to limit the anticipated variations of embodiments; but on the contrary, the intention is to cover all modifications, equivalents, and alternatives consistent with the spirit and scope of the embodiments as defined by the appended claims.

Generally speaking, methods and apparatuses for delaying execution of input/output (I/O) requests for solid state drives are contemplated. Some embodiments comprise receiving I/O requests for a solid state drive and calculating amounts of time for delays based on characteristics of the requests, such as differences of the logical block addresses (LBAs) of the requests. The embodiments may then delay responses by the solid state drive to the requests. Calculating the amounts of time and delaying the responses by the amounts of time may allow the solid state drives to emulate the responses of various types of hard disk drives.

Some embodiments comprise an apparatus for delaying execution of the I/O requests for solid state drives. The apparatuses may have numerous modules, such as a request receiver to receive the I/O requests, a calculation module to calculate the amounts of delay times, and a delay module to delay the responses of the I/O requests. Apparatuses may be used to delay execution of I/O requests of a USB flash drive or a static random access memory (SRAM) drive, as examples of SSDs.

While portions of the following detailed discussion describes embodiments with reference to specific data access protocols, such as logical block addressing, persons of ordinary skill in the art will recognize that embodiments may be implemented with other configurations and other data access protocols. Numerous embodiments discuss solid state drives storing user data files, such as spreadsheet and/or word processing files. However, solid state drives of various embodiments may store one or more of a variety of different files. Some files may comprise digitally encoded video files. Other files may comprise music files, picture and graphic image files, application files, and even operating system files, to name only a few.

Further, many solid state drives described herein describe using flash memory. As one skilled in the art will readily appreciate, solid state drives may utilize a variety of different memory technologies. Some solid state drives may use NAND-type flash memory. Other solid state drives may us NOR-type flash memory. Further embodiments may comprise solid state drives employing SDRAM, polymer memory, or phase change memory. Even further, some solid state drives may use a combination of memory technologies. For example, a solid state drive may comprise 256 gigabyte (GB) of NAND-type flash memory for storage of data and include a processor with 1 GB of DRAM memory to perform such actions as, e.g., data queuing and data buffering.

Turning now to the drawings, FIG. 1 shows an embodiment of a system 100 which may delay execution of I/O requests for one or more solid state drives. System 100 may comprise, as examples, a desktop tower platform or a notebook computer. System 100 may have a processor 105. In some embodiments, processor 105 may comprise a single core processor. In other embodiments, processor 105 may comprise a multiple-core processor. Processor 105 may be coupled to a memory controller hub (MCH) 115.

Processor 105 may execute operating instructions of user applications, such as instructions for spreadsheets and Internet browser applications, in memory 110 by interacting with MCH 115. MCH 115 may also couple processor 105 with an I/O controller hub (ICH) 120. ICH 120 may allow processor 105 to interact with external peripheral devices, such as keyboards, scanners, data storage devices, and various types of SSDs which store data, such as SSD 135. In the embodiment illustrated by FIG. 1, SSD 135 may comprise a flash memory card. For example, system 100 may comprise a digital video recorder. A user of system 100 may capture video via system 100, encode the video as one or more files, and store the files to SSD 135.

SSD 135 may couple to system 100 via an Institute of Electrical and Electronic Engineers (IEEE) 1394 interface 130. [See IEEE p1394 Working Group (1995), IEEE Std. 1394-1995 High Performance Serial Bus, IEEE, ISBN 0-7381-1203-8] [See also IEEE p1394a Working Group (2000), IEEE Std. 1394a-2000 High Performance Serial Bus—Amendment 1, IEEE, ISBN 0-7381-1958-X] [See also IEEE p1394b Working Group (2002), IEEE Std. 1394b-2002 High Performance Serial Bus—Amendment 2, IEEE, ISBN 0-7381-3253-5] In other words, SSD 135 may comprise a flash memory card coupled to system 100 via a FireWire® high speed data port interface, interface 130. A user of apparatus 100 may want to transfer video files from SSD 135 to a different or more permanent storage medium, such as a digital versatile disc (DVD). For example, SSD 135 may comprise a flash memory card of a digital camera, wherein the user may want to transfer picture files stored on SSD 135 onto a DVD so that she may erase the flash memory card for reuse. When transferring the files from SSD 135 to the DVD, system 100 may employ an apparatus for delaying execution of the read requests sent to SSD 135.

System 100 may present information, such as information of applications and multimedia video, to a user via a display 140. In some embodiments, the type of display device may be a cathode ray tube (CRT) monitor or an LCD screen or a thin-film transistor flat panel monitor. A user of system 100 may interact with applications executed by system 100 when retrieving information from and storing information to various SSDs of system 100.

In some embodiments, ICH 120 and processor 105 may process I/O requests to store and retrieve data via a universal serial bus (USB) device 150 via a Peripheral Component Interconnect (PCI) controller 145. [See Universal Serial Bus Revision 2.0 specification, 21 Dec. 2000, http://www.usb.org/developers/docs/usb_20_02212005.zip] [Also See PCI Local Bus Specification Revision 3.0, 3 Feb. 2004, http://www.pcisig.com/members/downloads/specifications/conventional/PCI_LB3.0-2-6-04.pdf] For example, USB device 150 may comprise a flash drive containing multiple user database files. Processor 105 may work in conjunction with ICH 120 to process input or read requests to retrieve the database files stored on USB device 150 and update the files via display 140. Processor 105 may also work in conjunction with ICH 120 to process write requests to save the updated data files on USB device 150 by way of PCI controller 145. For example, the user may receive a word processing document file via communication device 160 and save it to USB device 150.

USB device 150 may comprise a flash drive, a pen drive, or a thumb drive. In numerous embodiments, system 100 may comprise a desktop computer wherein a user of system 100 may use USB drive 150 in place of other storage mediums such as floppy disks, compact discs (CDs), DVDs, and zip drives. In numerous embodiments, USB device 150 may comprise a plug and play device that includes flash memory or other nonvolatile memory for storing data and a USB connector for connecting to a host device like, e.g., system 100. USB device 150 may employ an apparatus for delaying I/O requests sent to USB device 150.

In addition to USB device 150, ICH 120 of system 100 may also interact with various data storage devices. ICH 120 may interact with devices such as Advanced Technology Attachment (ATA) drives, such as ATA hard drives, CD drives, and DVD drives. [See Information Technology—AT Attachment with Packet Interface-7—Volume 3—Serial Transport Protocols and Physical Interconnect (ATA/ATAPI-7 V3), http://webstore.ansi.org/ansidocstore/product.asp?sku=ANSI+INCITS+397%2D2005+%28Vol%2E+3%29] For example, ICH 120 may allow system 100 to transfer information via SSD 170 coupled to system 100 with a parallel ATA bus 165. SSD 170 may comprise, e.g., a solid state drive inserted into an internal slot of a notebook computer, replacing a notebook hard disk drive. System 100 may employ one or more apparatuses to delay I/O requests for SSDs coupled to system 100 when transferring data between the SSDs and other data storage devices.

System 100 may also have a Serial ATA (SATA) bus 175 which may couple a serial solid state drive, such as SSD 180, to ICH 120. [See Serial ATA Revision 2.6, February-2007, http://www.serialata.org/specifications.asp] System 100 may store and retrieve files via SSD 180, using delayed I/O requests issued by processor 105, MCH 115, and ICH 120. System 100 may also be coupled to other types of hardware devices, such as Small Computer Systems Interface (SCSI) device 190 via a SCSI bus 185. For example, SCSI device 190 may comprise a SCSI hard disk drive or a SCSI Redundant Array of Independent Disks (RAID). Similar to SSD 180, in some embodiments SCSI device 190 may comprise an SSD coupled to system 100 via SCSI bus 185 and a SCSI interface.

In various embodiments, the SSDS such as SSD 180 and SSD 170 may provide backward compatibility with the sets of commands that may be issued to hard disk drives. For example, in one or more embodiments an SSD may employ a technique referred to as command queuing. For example, SSD 180 may employ such command queuing methods as Tagged Command Queuing and Native Command Queuing. [See Information Technology—AT Attachment with Packet Interface-7—Volume 3—Serial Transport Protocols and Physical Interconnect (ATA/ATAPI-7 V3), http://webstore.ansi.org/ansidocstore/product.asp?sku=ANSI+INCITS+397%2D2005+%28Vol%2E+3%29] [See Also Serial ATA Revision 2.6, February-2007, http://www.serialata.org/specifications.asp] By employing command queuing, an SSD, such as SSD 180, may accept numerous I/O requests, place them in one or more queues, and dynamically reorder the outstanding requests before executing them to reduce I/O latencies, such as seek time. For example, an embodiment may place a series of I/O requests in a queue, reorder the requests to place requests with the closest LBAs together, and execute the reordered I/O requests. Such command queuing may work in conjunction with apparatuses of system 100 used to delay I/O requests for SSDs.

While system 100 is shown to have numerous peripheral devices attached in the embodiment of FIG. 1, other embodiments may have different combinations of such hardware devices, such as only one or two of the devices. Additionally, system 100 may be coupled with other types of hardware not described, such as a sound card, a scanner, a printer, and other types of hardware devices. Some embodiments may include additional devices, such as a keyboard, a microphone, and a web cam. Such devices may transmit or receive data, requiring SSDs of system 100, such as SSD 180, to handle I/O requests resulting from the operation of the devices. In other words, system 100 depicted in FIG. 1 provides an illustrative embodiment that may vary in other embodiments.

Figure 2:
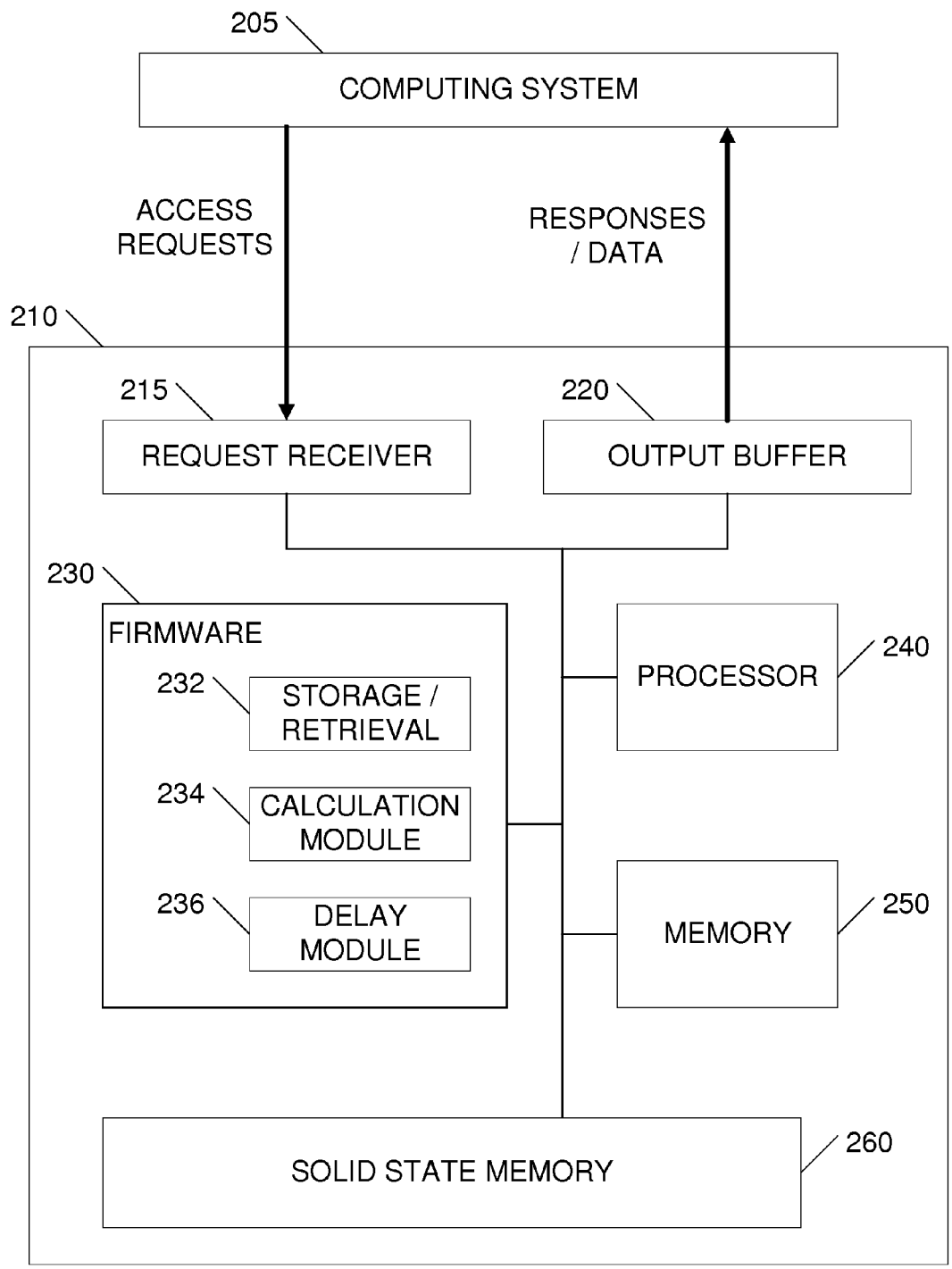
FIG. 2 shows an apparatus for processing requests of a solid state drive, comprising a request receiver, a calculation module, and a delay module.

To illustrate in more detail how a system or an apparatus, such as system 100, may delay execution of I/O requests for SSDs, we turn now to FIG. 2. FIG. 2 shows an apparatus 210 for processing requests of an SSD. Apparatus 210 may comprise, e.g., a USB drive, a flash card, or another type of SSD.

One or more elements of apparatus 210 may be in the form of hardware, software, or a combination of both hardware and software. For example, in one embodiment, storage/retrieval module 232, calculation module 234, and delay module 236 may comprise software coded instructions, executed in memory 250 by processor 240 of a computer. For example, one embodiment of apparatus 210 may comprise portions of coded instructions stored in firmware, which processor 240 may execute to perform data I/O processing for apparatus 210. Additionally, depending on the embodiment, one or more elements of apparatus 210 may reside in one or more hardware devices. For example, in one embodiment, the elements of apparatus 210 may reside in an SSD. In an alternative embodiment, some elements of apparatus 210 may reside in a separate device that may be coupled with an SSD, such as an in-line connector or interface, such as interface 130 depicted in FIG. 1.

Apparatus 210 may be coupled with a computing system 205. Computing system 205 may comprise one or more of a variety of different devices in different embodiments. For example, in one embodiment computing system 205 may comprise a desktop or laptop computer with apparatus 210 comprising a NAND-type SSD. In another embodiment, computing system 205 may comprise a personal video recorder coupled with a USB-connected SSD.

Computing system 205 may send a variety of types of access requests to apparatus 210 via request receiver 215. Access requests from computing system 205 may comprise read requests for data stored in solid state memory 260. Access requests from computing system 205 may also comprise write requests to store data in solid state memory 260. In addition to read and write requests for accesses of data, computing system 205 may issue other types of requests to apparatus 210. For example, computing system 205 may issue a format command to format solid state memory 260. Computing system 205 may also issue an erase command to erase only a portion of solid state memory 260, a list command to retrieve the names of files stored in a directory of solid state memory 260, or an inquiry into the size of solid state memory 260, such as the total number of logical block addresses or the amount of free storage space still available.

Apparatus 210 may receive the requests from computing system 205 and request receiver 215. For example, request receiver 215 may comprise an input buffer that may store a series of requests. Storing a series of requests, via request receiver 215 may allow computing system 205 to perform other actions, such as processing instructions of applications and handling interrupt requests for peripheral devices. Request receiver 215 may temporarily store the requests until processor 240 is able to process them. For example, processor 240 may already be in the process of executing a series of previously issued requests.

To process the requests from computing system 205, processor 240 may retrieve coded instructions from storage/retrieval module 232 of firmware 230 and place the instructions in memory 250 for processing. The coded instructions from storage/retrieval module 232 may allow processor 240 to interpret the I/O requests, such as distinguishing read requests from write requests. The coded instructions from storage/retrieval module 232 may keep track of recently accessed data locations, such as the logical block addresses (LBAs) of previous read/write requests. The coded instructions from storage/retrieval module 232 may also allow processor 240 to perform a variety of other actions, such as bad block management, queue maintenance, error code correction, wear leveling, data encryption, and garbage collection.

Apparatus 210 may comprise an SSD that is a drop-in replacement for a particular model of hard disk drive previously coupled with computing system 205. One or more applications executed on computing system 205 may expect apparatus 210 to respond in a particular way in one or more situations. For example, one or more legacy applications executed by computing system 205 may depend on seek times, which are illustrated in more detail in the following paragraph, associated with read/write requests issued to apparatus 210. Alternatively, a designer may want to restrain performance of the SSD to meet a performance requirement imposed by at least one of an attached system, such as computing system 205, to meet a hardware requirement, such as an operating requirement imposed by interface hardware 130, to satisfy a software requirement, or to meet a customer request of the SSD.

As noted previously, hard disk drives store information on spinning platters and position read/write heads above the platters to read and write the data from/to the platters. Moving the heads from one place to another takes time, commonly referred to as seek time. Seek time impacts hard drive performances, in terms of I/Os per second, with generally greater impact attributed to random read/write requests, as compared to sequential read/write requests. To operate properly, one or more applications of computing system 205 may depend on the seek times inherent in the operation of hard disk drives.

Apparatus 210 may not have any mechanical parts. Consequently, the amount of time that apparatus 210 takes to locate data stored in solid state memory 260, which may comprise flash memory, may depend on the efficiency of such items as, the speed of processor 240, the speed of solid state memory 260, and firmware 230. To address the differences of delay in operation of hard disk drives versus apparatus 210, apparatus 210 may also comprise a calculation module 234 and a delay module 236. Calculation module 234 and delay module 236 may allow apparatus 210 to emulate the response of a hard disk drive. For example, calculation module 234 and delay module 236 may allow apparatus 210 to respond similar to a hard disk drive instead of a faster SSD drive, allowing the time-sensitive applications of computing system 205 to execute properly.

To emulate the delays associated with seek times of a hard disk drive, processor 240 may retrieve coded instructions from calculation module 234 and place the instructions in memory 250 for processing. The coded instructions from calculation module 234 may allow processor 240 to calculate a synthetic delay based on characteristics of the requests for accesses to data of solid state memory 260. The characteristics may comprise a variety of factors, which may include a comparison of the types of the requests, the amount of transfer of data to be transferred for each request, and the physical locations of the data to be accessed by the requests. For example, calculation module 234 may perform calculations based upon the logical block addresses of the requests. Alternative embodiments may perform calculations based upon the location of the data via a calculation involving cylinder-head-sector information of the requests.

Calculation module 234 may allow processor 240 to examine the characteristics of the requests from computing system 205 and determine a delay corresponding to differences of the characteristics. For example, calculation module 234 may allow processor 240 determine an amount of time for a synthetic delay, which may be in addition to latency of storage/retrieval module 232. The amount of time may correspond to the period that elapses between computing system 205 issuing a read/write request to apparatus 210 and the time that apparatus 210 responds, so that apparatus 210 may simulate or emulate the seek time of a hard disk drive.

Once processor 240 determines an amount of time for a delay of a set of requests, delay module 236 may allow processor 240 to delay processing of one of the requests for the determined amount of time. For example, delay module 236 may comprise a delay loop that stalls processor 240 for the determined amount of time, before passing control back to storage/retrieval module 232. Upon receiving the request after the delay, storage/retrieval module 232 may immediately process the request, storing the results of the request in output buffer 220. For example, output buffer 220 may comprise a data buffer that holds data retrieved from solid state memory 260 until computing system 205 can transfer the data from apparatus 210.

Depending on the embodiment, the amount of time of delay may be calculated differently. For example, in various embodiments, the amount of time may not closely correspond to the actual seek times of a hard drive in order to allow apparatus 210 to perform better than the hard drive. In numerous embodiments, calculation module 234 may determine the amount of time using a function that generates a continuous set of delay values. In one or more alternative embodiments, calculation module 234 may calculate delay values that are not continuous, such as by generating a set often amounts of delay that vary in ten percent increments, increasing from zero delay to a delay limit based on the characteristics of the requests.

Figure 3:
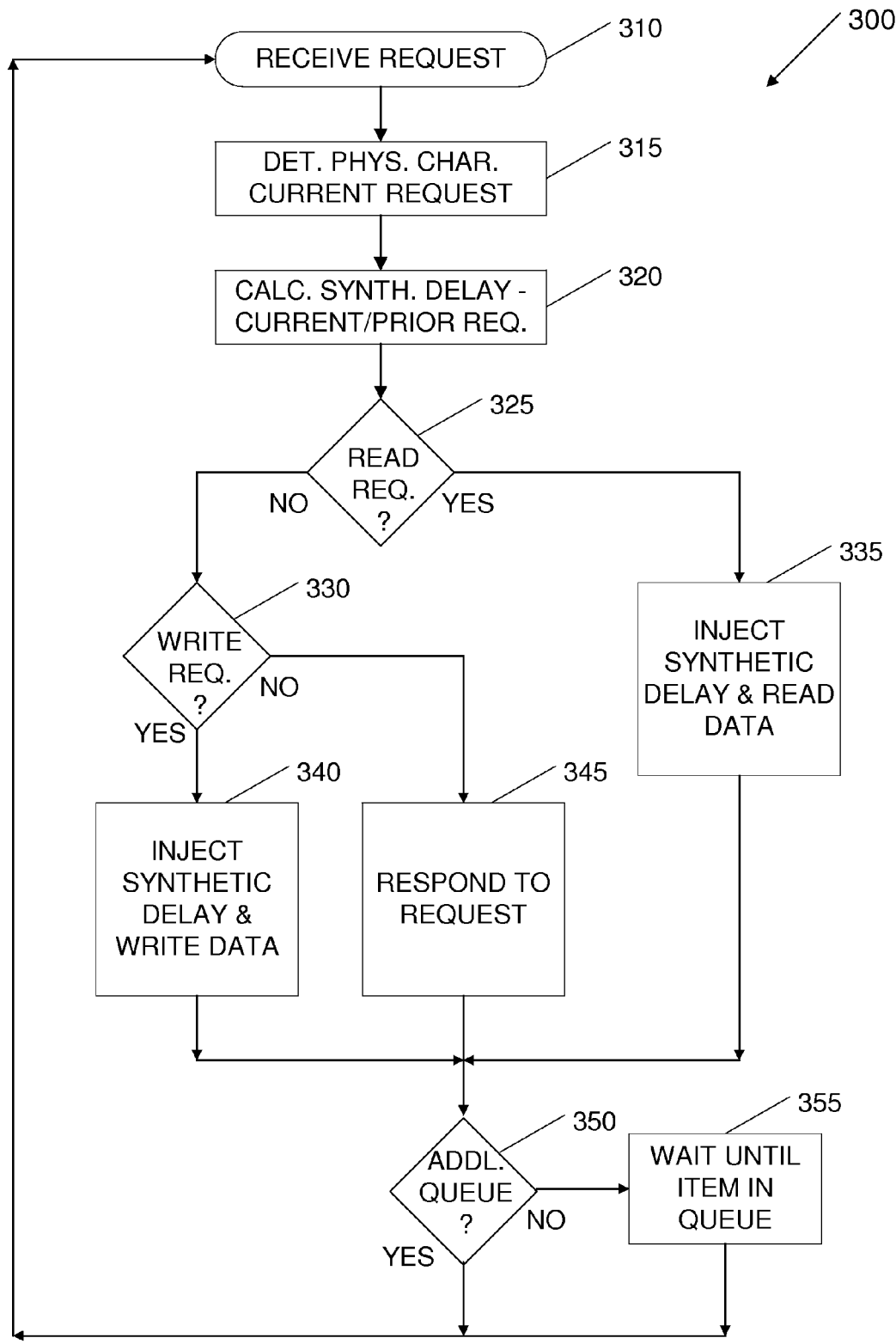
FIG. 3 is a flowchart that illustrates the actions a solid state drive may perform when delaying execution of input/output requests.

FIG. 3 shows a flowchart 300 that illustrates actions an SSD may perform when delaying execution of I/O requests. For example, SSD 180 of system 100 may perform the actions described by flowchart 300 when executing a series of requests issued by processor 105.

When a host or embedded system submits an I/O request to an SSD, the SSD may receive the request (element 310) by determining the physical characteristics of the request (element 315). For example, system 100 may submit a read request for a portion of a video file stored on SSD 180. System 100 may request SSD 180 to transmit 64 kilobytes (KB) of data starting at LBA 4001761. SSD 180 may respond to the read request by determining one or more characteristics of the read request. For example, SSD 180 may extract the starting LBA number, 4001761, and store the number in local memory of SSD 180 in preparation for calculating a delay time.

SSD 180 may then calculate a synthetic amount of delay based on the current request and a prior request (element 320). Continuing with our example, SSD 180 may have completed a write request immediately prior to receiving the read request for the portion of the video file. SSD 180 may have stored one or more characteristics of the write request, which may have comprised writing an ending string of bits in LBA 2681179. SSD 180 may calculate a synthetic delay to emulate the amount of time that would elapse if SSD 180 were a hard disk drive, having to move one or more access heads from LBA 2681179 to LBA 4001761.

With the current request being a read request (element 325), SSD 180 may inject the calculated synthetic delay for the combination of the write request of LBA 2681179 and the read request for the 64 KB of data starting at LBA 4001761 of SSD 180. In other words, processor 105 may transfer the 64 KB of data from an output buffer of SSD 180 to memory 110 via ICH 120 and MCH 115. If the current request had instead been a write request (element 330), SSD 180 may have injected a calculated synthetic delay corresponding to the LBA 2681179 write request and the LBA of the current write request before writing the data (element 340).

In various embodiments, the SSDs may process commands for other types of accesses (element 345), not just read requests and write requests. For example, processor 105 may issue SSD 170 a command or request to list the names of files stored in particular directory of SSD 170, or an inquiry into the free space of storage for SSD 135.

After responding to the read/write requests (elements 335 and 340), or otherwise responding to the request (element 345), an SSD may determine whether any additional requests remain in a queue of the SSD (element 350). If additional requests remain, the SSD may immediately start processing them (element 310). If no additional requests are pending, the SSD may enter a wait state until one or more requests appear in the queue (element 355). The SSD may continue the process of determining the physical characteristics of current requests (element 315) and calculating synthetic delays based on the physical characteristics of the current and prior requests (element 320).

Figure 4:
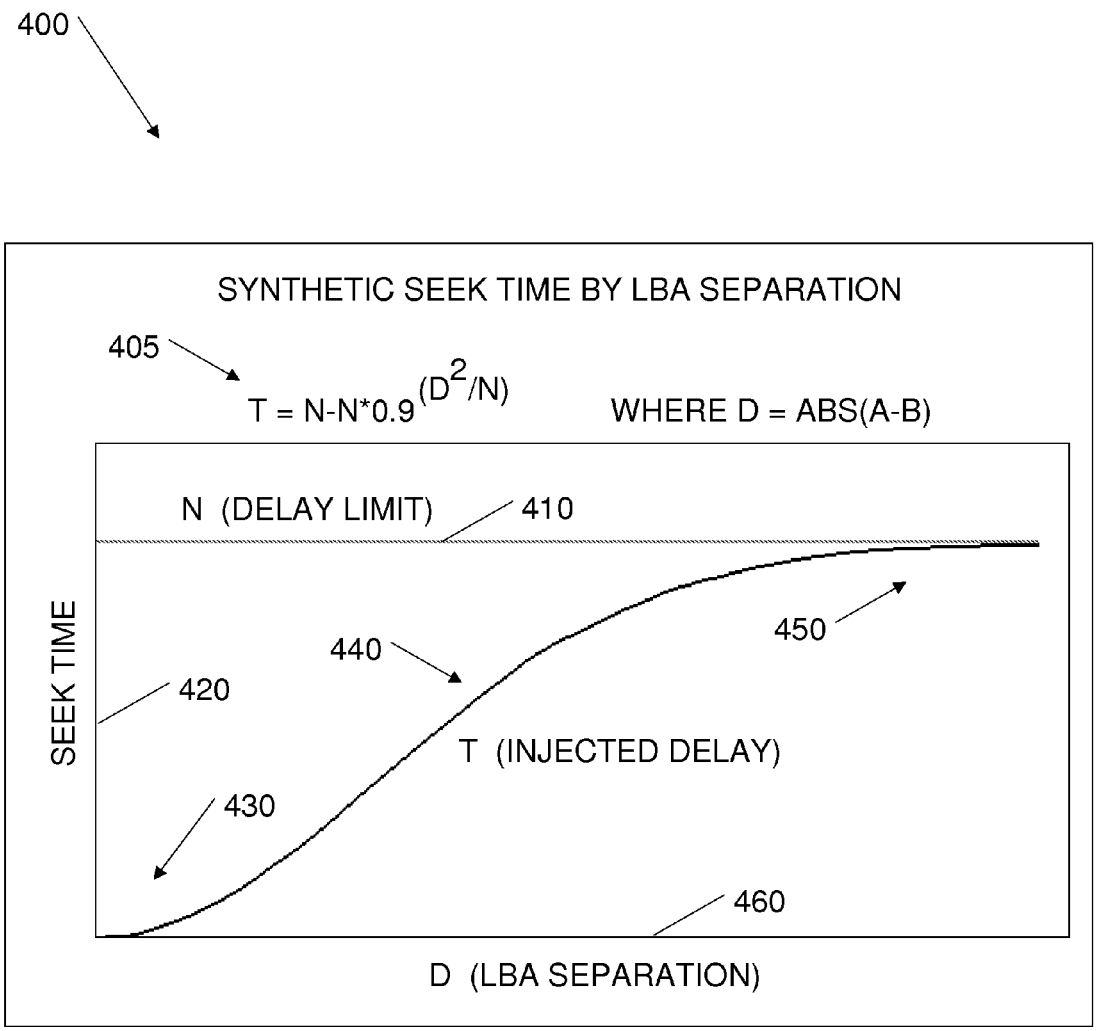
FIG. 4 depicts a graph for a function illustrating how a calculated amount of time for a delay may change as logical block address separation increases.

FIG. 4 depicts a graph 400 for a function illustrating how a delay, of seek time 420, may change as the characteristics of the I/O requests change, such as the separation of the logical block addresses increasing. The function of FIG. 4, represented by formula 405, is one function that may be implemented in numerous embodiments. Alternative embodiments may implement different functions, or may alter one or more of the parameters of function 405, such as by changing the fraction of "0.9" to "0.85". Additionally, further embodiments may vary the fraction even more, such as from zero to one.

Adding extra delay in the processing of the commands for SSDs may generally impact performance in some way. However, the chosen formula may reduce the performance impact. Formula 405 shown in FIG. 4 has several features, which may help reduce performance impact. Formula 405 takes a "numerical distance" (D) of a current LBA (A) and a previous LBA (B). As shown in FIG. 4, the numerical distance may be defined as the absolute value of the difference between the current and previous LBAs, represented as "ABS (A-B)". The amount of time (T) may, therefore, be defined as $T=N-N*0.9^{((D^2)/N)}$ in one or more embodiments.

An embodiment may use formula 405 to calculate values of delay (T) that emulate seek time 420 as the magnitude of the LBA separation 460 increases. Formula 405 represents an exponential function that starts at 0 and asymptotically approaches a delay limit (N) 410. For example, a designer may select a value of the delay limit (N) to set an upper bound for amounts of time inserted to delay responses of SSDs. A specific instance may be where the designer wants to ensure that an SSD responds to an I/O request within a specified amount of time, even for large values of LBA separation 460. In alternative embodiments, the delay limit (N) may be determined a priori by a variety of different methods of calculation or arbitration, to ensure that the calculated time is equal to or less than a desired delay limit or other boundary value.

Because formula 405 evaluates to 0 when LBA A and LBA B are equal, or near zero, when LBA A and LBA B are relatively close, formula 405 may decrease the performance impact for sequential reads/writes. In other words, similar to the seek time response of a hard disk drive executing sequential reads/writes, formula 405 generates small amounts of delay when the separation 460 of the requests is also small. Region 430 of graph 400 represents values of T that correspond to relatively small differences of LBA separation 460.

Because the calculated amounts of delay from formula 405 may be bounded by the delay limit 410, formula 405 may reduce the impact to performance of an SSD for random reads/writes, even for values of LBA separation that are relatively large. In other words, an embodiment may choose a formula to calculate amounts of delay that do not exceed a delay limit, with the delay limit being chosen based on system factors to help ensure compatibility with hard disk drives and to ensure compliance with SSD specifications. For example, a designer of the SSD may select N to equal 4 milliseconds (ms).

As illustrated in FIG. 4, formula 405 generates values of delay that are approximately zero for region 430 and asymptotically approach delay limit 410 for region 450 for large values of LBA separation 460. In the middle region 440, formula 405 calculates values of delay that increase monotonically. Depending on the formula used in alternative embodiments, the regions may vary. For example, one embodiment may comprise region 430 spanning from zero separation 460 to 30% of separation 460, with middle region 440 spanning from 30% to 90% and region 450 spanning from 90% to 100% of separation 460. Also, depending on the formula used in alternative embodiments, the delay may not increase monotonically, but instead may increase in steps, or may have local maxima and/or minima. For example, one embodiment may have delay increase to the limit N and then decrease back to zero.

Figure 5:
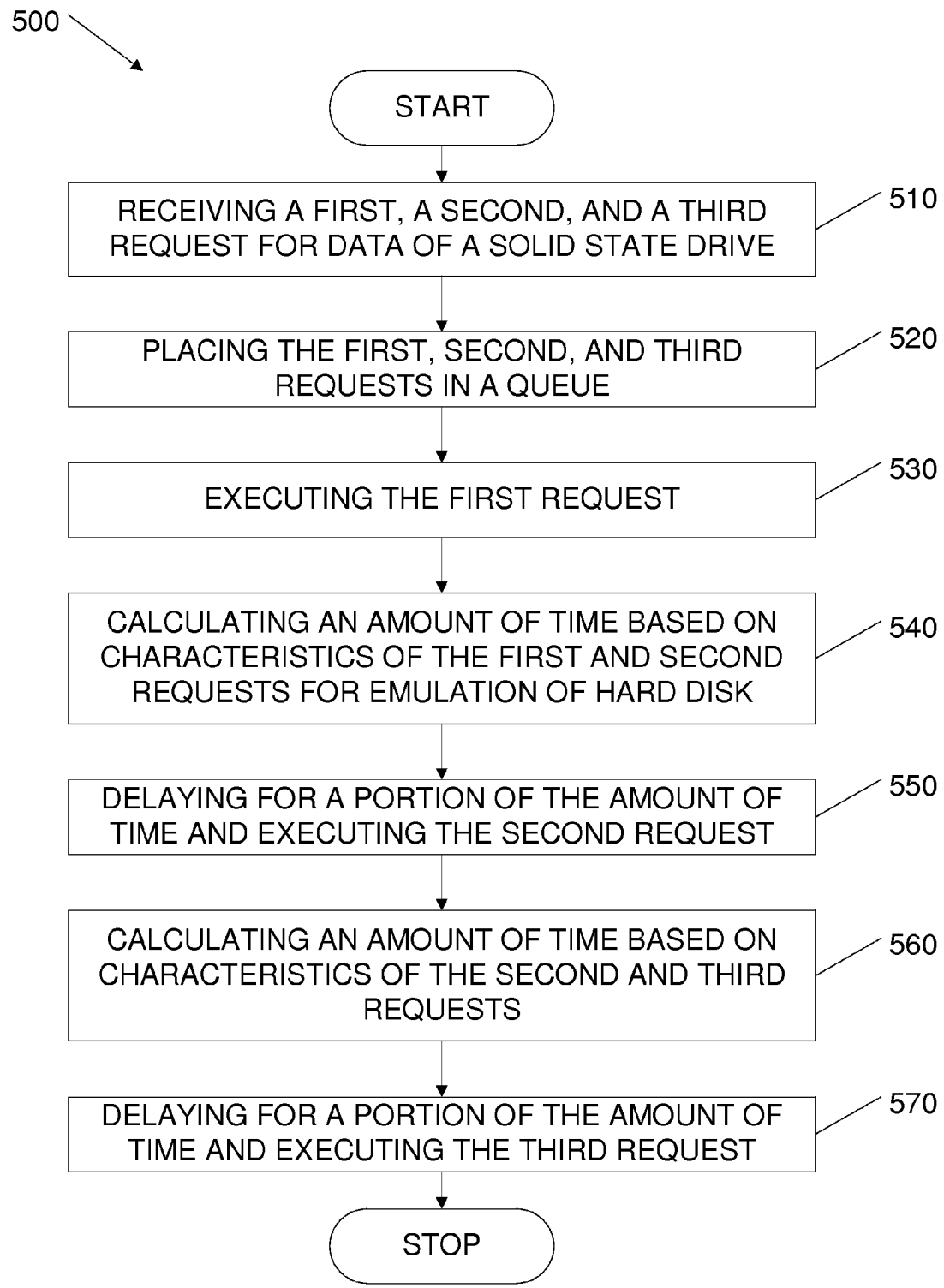
FIG. 5 illustrates a method of delaying execution of input/output requests for a solid state drive.

FIG. 5 depicts a flowchart 500 illustrating a method of delaying execution of I/O requests for a solid state drive. Flowchart 500 begins with receiving a first, a second, and a third request for data of a solid state drive (element 510). For example, computing system 205 may generate a series of write requests to save data from a number of applications being executed by computing system 205 to apparatus 210, as shown in FIG. 2. Apparatus 210 may receive the write requests and place the requests in a queue in memory 250 (element 520).

Because a user may have just booted computing system 205, calculation module 234 may not have a previous request to use for calculating an amount of time for a synthetic delay. Consequently, calculation module 234 may generate a default delay of 1 ms, causing delay module 236 to pause for 1 ms, or at least a portion of the delay, before causing processor 240 to execute the first request (element 530). Apparatus 210 may then proceed to execute the second request.

Apparatus 210 may calculate an amount of time to delay before executing the second request based on characteristics of the first and second requests (element 540). Continuing with our previous example, calculation module 234 may have caused processor 240 to store C-H-S information or the ending LBA of the first request to memory 250. Calculation module 234 may then cause processor 240 to store C-H-S information or the beginning LBA for the second request to memory 250, and use the two stored values to calculate the amount of time for the delay. For example, calculation module 234 may calculate a value of T in middle region 440 of graph 400, based on the separation of the LBAs of the requests or the separation of the C-H-S values. Calculation module 234 may cause delay module 236 to pause for the calculated delay, or at least a portion of the delay, before causing processor 240 to execute the second request (element 550). For example, in at least a few embodiments, the calculated value may be used for another purpose, in addition to the delay period. In such embodiments a portion of the calculated value may be used for the delay while another portion of the calculated value may be used for another purpose, such as hardware timing.

Apparatus 210 may then calculate another amount of time to delay before executing the third request based on characteristics of the second and third requests (element 560). Continuing with our previous example, calculation module 234 may have caused processor 240 to store the ending LBA associated with the second request to memory 250. Calculation module 234 may then cause processor 240 to store the beginning LBA for the third request to memory 250, and use the two stored values to calculate the second amount of time for the delay. For example, the separation between the LBAs of the second and third requests may be relatively small, such as for writes of data to consecutive LBAs. Consequently, calculation module 234 may calculate a value of T in region 430 of graph 400, based on the separation of the LBAs. Calculation module 234 may then cause delay module 236 to pause for the small amount of calculated delay before causing processor 240 to execute the third request (element 570).

Those skilled in the art, having the benefit of this disclosure, will appreciate that the embodiments herein contemplate methods and apparatuses for delaying execution of input/output requests for solid state drives. The form of the embodiments shown and described in the detailed description and the drawings are to be taken merely as examples. The following claims are intended to be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present specification is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:

1. A method, comprising:
receiving a first request and a second request, wherein the first and second requests are for accesses of data of a solid state memory of a solid state drive;
calculating an amount of time based on a characteristic of the first and second requests, wherein the calculation relates to emulation of the first and second requests being issued to a hard disk drive, wherein the calculated amount of time equals: $N-N*0.9^{(D^2/N)}$, wherein further N equals a limit and D equals an absolute value of the difference, wherein further the difference comprises subtracting logical block addresses of the current and prior requests;
delaying a response for the second request by at least a portion of the amount of time;
executing the second request to access the solid state memory of the solid state drive; and
responding to the second request after the delaying.

2. The method of claim 1, further comprising receiving a third request and delaying a second response for the third request by a second amount of time.

3. The method of claim 2, further comprising placing the second and third requests in a queue for the solid state drive.

4. The method of claim 1, wherein the receiving the first and second requests comprises receiving at least one write request.

5. The method of claim 1, wherein the receiving the first request and the second request comprises receiving requests to access data of a first logical block address and a second logical block address, respectively.

6. The method of claim 1, wherein the calculating the amount of time comprises determining the amount of time to be approximately equal to zero when an absolute value of subtraction of the first logical address from the second logical address is relatively small, wherein further the amount of time asymptotically approaches a limit as the absolute value increases.

7. An apparatus, comprising:
a request receiver to receive a current request and a prior request for accesses of data of a solid state drive, wherein the current and prior requests are via logical block addresses;
a calculation module to calculate an amount of time to delay a response to the current request, wherein the amount of time is related to a difference of logical block addresses of the current and prior requests, wherein the calculated amount of time equals: $N-N*0.9^{(D^2/N)}$, wherein further N equals a limit and D equals an absolute value of the difference, wherein further the difference comprises subtracting logical block addresses of the current and prior requests;
a delay module to delay the response to the current request by the amount of time; and
a processor to execute the second request to access the solid state memory of the solid state drive and to respond to the second request after a delay of the response via the delay module.

8. The apparatus of claim 7, further comprising a processor coupled with dynamic random access memory, wherein the solid state drive comprises a flash memory storage device.

9. The apparatus of claim 8, wherein the apparatus comprises one of a universal serial bus flash memory drive, a flash memory card for a portable computing device, and an integrated circuit chip of a motherboard.

10. The apparatus of claim 7, further comprising firmware coded instructions stored in nonvolatile memory of the solid state drive, the firmware coded instructions to control operation of the solid state drive.

11. The apparatus of claim 7, wherein at least one of the request receiver, the calculation module, and the delay module comprises a device of an interface module for the solid state drive.

12. The apparatus of claim 7, wherein the calculation module is arranged to calculate the amount of time to be approximately equal to zero when the difference is less than one percent of the magnitude of the largest block address of the solid state drive.

13. The apparatus of claim 7, wherein the calculated amount of time increases monotonically for values of the difference between 30% and 90% of a range, wherein the range comprises a lower bound value of zero and an upper bound value of the largest logical block address of the solid state drive.

14. A tangible, machine-accessible, storage medium containing instructions, which when executed by a processor, cause the processor to perform operations, the operations comprising:
determining a difference between a first request and a second request, wherein the first and second requests are for accesses of data of a solid state drive;
calculating an amount of time to delay a response of the second request, wherein the calculation of the amount of time is to emulate a seek time of the second request if the first request and the second request were issued to a hard disk drive, wherein the calculated amount of time equals: $N-N*F^{(D^2/N)}$, wherein further N equals a limit, D equals an absolute value of the difference of subtracting logical block addresses of the first and second requests, and F equals a fraction between 0 and 1;
delaying the response to the second request by the amount of time;
executing the second request to access the solid state memory of the solid state drive; and
responding to the second request after the delaying.

15. The tangible, machine-accessible, storage medium of claim 14, further comprising receiving the first request and the second request from a laptop computing device.

16. The tangible, machine-accessible, storage medium of claim 14, wherein the calculating the amount of time comprises calculating step values for values of differences, wherein the differences are absolute value differences of the logical block addresses of the first and second requests.

17. The tangible, machine-accessible, storage medium of claim 14, wherein the limit N is determined via a method of calculation or arbitration to confine the calculated amount of time to less than a boundary value.

18. The tangible, machine-accessible, storage medium of claim 14, wherein the calculated amount of time is to restrain performance of the solid state drive to meet a performance requirement imposed by at least one of an attached system, hardware, software, and a customer request.

* * * * *